(12) United States Patent
Hsu

(10) Patent No.: US 11,995,916 B2
(45) Date of Patent: May 28, 2024

(54) ELECTRONIC DEVICE CAPABLE OF IDENTIFYING INELIGIBLE OBJECT

(71) Applicant: PixArt Imaging Inc., Hsin-Chu County (TW)

(72) Inventor: En-Feng Hsu, Hsin-Chu County (TW)

(73) Assignee: PIXART IMAGING INC., Hsin-Chu County (TW)

( * ) Notice: Subject to any disclaimer, the term of this patent is extended or adjusted under 35 U.S.C. 154(b) by 0 days.

(21) Appl. No.: 17/985,268

(22) Filed: Nov. 11, 2022

(65) Prior Publication Data

US 2023/0076392 A1 Mar. 9, 2023

Related U.S. Application Data

(63) Continuation of application No. 17/091,038, filed on Nov. 6, 2020, now Pat. No. 11,527,103, which is a continuation of application No. 15/696,403, filed on Sep. 6, 2017, now Pat. No. 10,867,161.

(51) Int. Cl.
| | |
|---|---|
| *G06V 40/16* | (2022.01) |
| *G06F 18/25* | (2023.01) |
| *G06T 7/62* | (2017.01) |
| *G06T 7/73* | (2017.01) |
| *G06V 10/10* | (2022.01) |
| *G06V 10/20* | (2022.01) |
| *G06V 10/40* | (2022.01) |
| *G06V 10/80* | (2022.01) |

(52) U.S. Cl.
CPC .......... *G06V 40/172* (2022.01); *G06F 18/253* (2023.01); *G06V 10/17* (2022.01); *G06V 10/40* (2022.01); *G06V 10/806* (2022.01); *G06V 40/165* (2022.01); *G06V 40/166* (2022.01); *G06V 40/167* (2022.01); *G06V 40/168* (2022.01); *G06T 7/62* (2017.01); *G06T 7/74* (2017.01); *G06T 2207/20024* (2013.01); *G06V 10/10* (2022.01); *G06V 10/20* (2022.01); *H04M 2250/52* (2013.01)

(58) Field of Classification Search
CPC ...... G06V 40/172; G06V 10/17; G06V 10/40; G06V 10/806; G06V 40/165; G06V 40/166; G06V 40/167; G06V 40/168; G06V 10/10; G06V 10/20; G06F 18/253; G06F 21/32; G06T 7/62; G06T 7/74; G06T 2207/20024; H04M 2250/52

See application file for complete search history.

(56) References Cited

U.S. PATENT DOCUMENTS

| | | | | |
|---|---|---|---|---|
| 9,710,691 B1* | 7/2017 | Hatcher | ............ | G06V 40/1353 |
| 10,922,590 B2* | 2/2021 | Raynor | ............. | G06V 30/2504 |
| 11,657,132 B2* | 5/2023 | Tussy | ................. | G06Q 20/3276 |
| | | | | 726/6 |
| 2014/0168059 A1* | 6/2014 | Kim | ........................ | G06F 3/005 |
| | | | | 345/156 |

(Continued)

*Primary Examiner* — Mia M Thomas
(74) *Attorney, Agent, or Firm* — WPAT, P.C

(57) ABSTRACT

An electronic device for face recognition is provided. The electronic device is used to exclude an ineligible object to be identified according to the relative relationship between object distances and image sizes, the image variation with time and/or the feature difference between images captured by different cameras to prevent the possibility of cracking the face recognition by using a photo or a video.

18 Claims, 5 Drawing Sheets

(56) References Cited

U.S. PATENT DOCUMENTS

| | | | |
|---|---|---|---|
| 2016/0255303 A1* | 9/2016 | Tokui | G06T 3/20 |
| | | | 348/14.01 |
| 2016/0358332 A1* | 12/2016 | Watanabe | A61B 5/725 |
| 2018/0300896 A1* | 10/2018 | Zhang | G06F 3/012 |
| 2019/0058847 A1* | 2/2019 | Mayer | G06V 40/165 |
| 2021/0064851 A1* | 3/2021 | Zhang | G06V 10/50 |
| 2021/0166045 A1* | 6/2021 | Kwak | G06V 40/166 |
| 2022/0292883 A1* | 9/2022 | Ohno | G06V 40/45 |
| 2023/0298386 A1* | 9/2023 | Shioda | G06T 7/70 |
| | | | 382/118 |

* cited by examiner

ELECTRONIC DEVICE CAPABLE OF IDENTIFYING INELIGIBLE OBJECT

CROSS REFERENCE TO RELATED APPLICATION

This application is a continuation application of U.S. patent application Ser. No. 17/091,038 filed on Nov. 6, 2020, which is a continuation application of U.S. patent application Ser. No. 15/696,403 filed on Sep. 6, 2017, the full disclosures of which are incorporated herein by reference.

BACKGROUND

1. Field of the Disclosure

This disclosure generally relates to face recognition, more particularly, to an auxiliary filtering device and a starting method for an electronic device used to remove an ineligible object to be recognized before or after performing identity recognition using the face recognition.

2. Description of the Related Art

With the development of the digital electronic device, various data has been gradually stored in a form of digital data. Accordingly, the protection of the digital data has become an important issue. The electronic locks using bio-recognition, e.g., fingerprint recognition, iris recognition, face recognition and voiceprint recognition, have been widely applied to various electronic devices. The bio-recognition performs the identity recognition generally through the machine learning to realize the personal security lock to effectively improve the security protection of personal information.

However, using the face recognition among the bio-recognition methods as an electronic security lock still has the risk of being cracked, e.g., using a picture or video containing an object to be identified still being possible to unlock the electronic security lock to expose the personal information. Of course, in some conditions it is possible to use multiple bio-recognition methods together to improve the protection, e.g., incorporating the fingerprint recognition and face recognition, but the product cost will be increased accordingly.

Accordingly, an identity recognition method using the face recognition that will not be cracked by using a picture or video is necessary.

SUMMARY

The present disclosure provides an auxiliary filtering device for face recognition and a starting method for an electronic device that perform an additional filtering procedure in addition to the identity recognition using face recognition so as to exclude an ineligible object to be identified. In this way, it is able to prevent the face-recognition based electronic security lock from being cracked using a picture or video.

The present disclosure provides an electronic device including a first camera, a second camera, a memory and a processor. The first camera captures a first image. The second camera captures a second image. The memory previously stores a relative relationship between face positions and face sizes in an image. The processor calculates a first distance of a first face position from a first edge of the first image and a first face size of a first face in the first image, and compares the first face size with a first predetermined size range corresponding to the first distance to identify whether the first face is an ineligible object.

The present disclosure further provides an electronic device including a first camera, a second camera, a memory and a processor. The first camera captures a first image. The second camera captures a second image. The memory previously stores a relative relationship between face positions and face sizes in an image. The processor calculates a first two-dimensional position and a first face size of a first face in the first image, and compares the first face size with a first predetermined size range corresponding to the first two-dimensional position to identify whether the first face is an ineligible object.

The auxiliary filtering device of the present disclosure operates before or after performing the identity recognition based on face recognition to improve the protection ability of the electronic security lock.

The auxiliary filtering device does not calculate depths of every point of a current face to construct a 3D image during the filtering procedure. The 3D image is constructed to perform the identity recognition in the following face recognition procedure depending on the used algorithm.

BRIEF DESCRIPTION OF THE DRAWINGS

Other objects, advantages, and novel features of the present disclosure will become more apparent from the following detailed description when taken in conjunction with the accompanying drawings.

DETAILED DESCRIPTION OF THE EMBODIMENT

It should be noted that, wherever possible, the same reference numbers will be used throughout the drawings to refer to the same or like parts.

The present disclosure is adaptable to an electronic security lock of an electronic device, and the electronic security lock uses the face recognition as an identity recognition algorithm to perform the unlocking. In the present disclosure, an additional auxiliary filtering device is operated before or after performing the identity recognition to exclude an ineligible object to prevent the electronic security lock from being cracked by an unknown person using a photo or video containing a correct face thereby improving the protecting ability.

Said excluding the ineligible object herein is referred to that the electronic device is not turned on even though the recognized identity is correct since the auxiliary filtering device identifies that a current face is a photo or video. Said not turned on herein is referred to that a display screen is not turned on and only the camera and the processor which runs the filtering algorithm are turned on.

Figure 1:
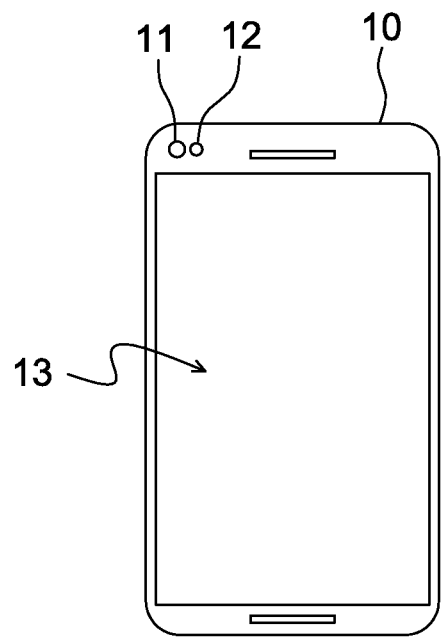
FIG. 1 is a schematic diagram of an electronic device employing an auxiliary filtering device for face recognition according to one embodiment of the present disclosure.

Referring to FIG. 1, it is a schematic diagram of an electronic device 10 employing an auxiliary filtering device for face recognition according to one embodiment of the present disclosure. In this embodiment, the electronic device 10 is described by a cellphone, but the present disclosure is not limited thereto. The electronic device 10 is any device using an electronic security lock, e.g., a notebook computer, a tablet computer, a PDA, a monitor system, a work station, a vehicle control system or the like.

The electronic device 10, taking a cellphone as an example, includes a first camera 11 and a second camera 12. In FIG. 1, the arranged locations of the first camera 11 and the second camera 12 are only intended to illustrate but not to limit the present disclosure. The first camera 11 and the second camera 12 are preferably arranged along a left-right direction with respect to a user. In other embodiments (e.g., using the position and size to perform the filtering), the first camera 11 and the second camera 12 are arranged along an up-down direction or on an oblique line with respect to the user.

In one embodiment, the first camera 11 is a front camera of the cellphone, and said front camera is the camera at a side of a screen 13 of the cellphone. In addition, the second camera 12 is preferably always on, but the first camera 11 is turned on only when a human face is detected by the second camera 12. Accordingly, to save the power, a number of pixels (e.g., lower than 640×480) of the second camera 12 is preferably much smaller than a number of pixels (e.g., higher than 1920×1080) of the first camera 11. However, in other embodiments, if the power consumption is not an important issue to be considered, the second camera 12 and the first camera 11 have an identical number of pixels. Said number of pixels herein is referred to a pixel number of a pixel array included in the first camera 11 and the second camera 12.

Figure 2:
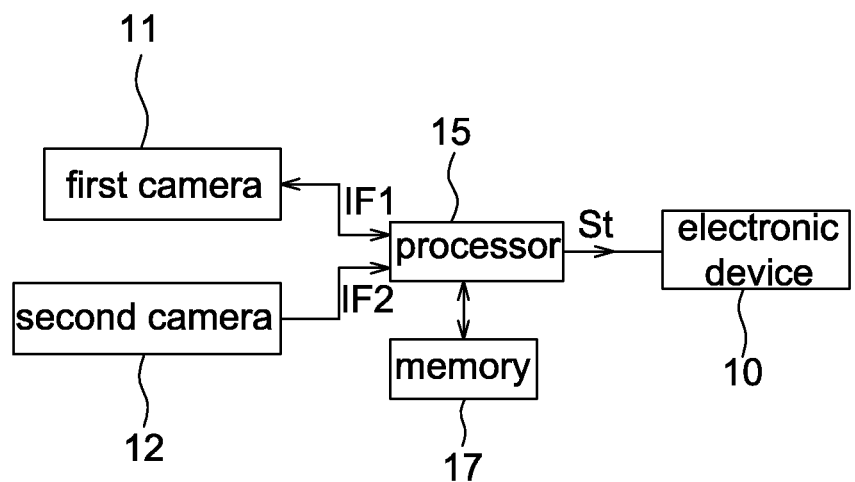
FIG. 2 is a block diagram of an auxiliary filtering device for face recognition according to one embodiment of the present disclosure.

Referring to FIG. 2, it is a schematic block diagram of an auxiliary filtering device for face recognition according to one embodiment of the present disclosure including a first camera 11, a second camera 12, a processor 15 and a memory 17. It should be mentioned that although FIG. 2 shows the auxiliary filtering device and the electronic device 10 by different functional blocks, it is only intended to illustrate but not to limit the present disclosure. The auxiliary filtering device is included in the electronic device 10 or is an independent device outside the electronic device 10 without particular limitations.

The first camera 11 includes, for example, a solid state image sensor and is used to receive light within a field of view thereof (FIG. 1 showing a range in front of the screen 13 of the electronic device 10) to capture a first image IF1. The second camera 12 includes, for example, a solid state image sensor and is used to receive light within a field of view thereof (FIG. 1 also showing a range in front of the screen 13 of the electronic device 10) to capture a second image IF2. The second image sensor 12 is an independent image sensor different from a proximity sensor. As mentioned above, the first camera 11 and the second camera 12 have an identical or different numbers of pixels, and thus the first image IF1 and the second image IF2 have an identical size or different sizes.

The processor 15 is electrically coupled to the first camera 11 and the second camera 12 via, for example, a bus line or a signal line to respectively receive the first image IF1 and the second image IF2, and performs the post-processing such as face recognition and object filtering (described below with an example). The processor 15 also controls the first camera 11 and the second camera 12 to capture images. The processor 15 is, for example, a digital signal processor (DSP), a microcontroller (MCU), a central processing unit (CPU) or an application specific integrated circuit (ASIC), and the processor 15 implements said post-processing by software, hardware, firmware or a combination thereof according to different applications.

The memory 17 is a volatile memory or a non-volatile memory, and used to previously store an algorithm for face detection, an algorithm for identity recognition based on face recognition, an algorithm for object filtering, parameters used in the above algorithms, a relative relationship between object positions and object sizes in an image (described below with an example), wherein said parameters are referred to the parameter obtained by machine learning for the face detection, identity recognition and object filtering. After receiving the first image IF1 and the second image IF2, the processor 15 performs the calculation of the face detection, identity recognition and object filtering according to the built-in algorithm and by accessing the parameters stored in the memory 17.

In the present disclosure, the processor 15 realizes the face detection and the identity recognition using the known algorithms without particular limitations. The present disclosure is to perform an additional object filtering function before or after the identity recognition is performed to exclude an ineligible object. In the present disclosure, said ineligible object is referred to a face contained in a photo or a video, and said face has a correct identity or an incorrect identity.

Figure 3A:
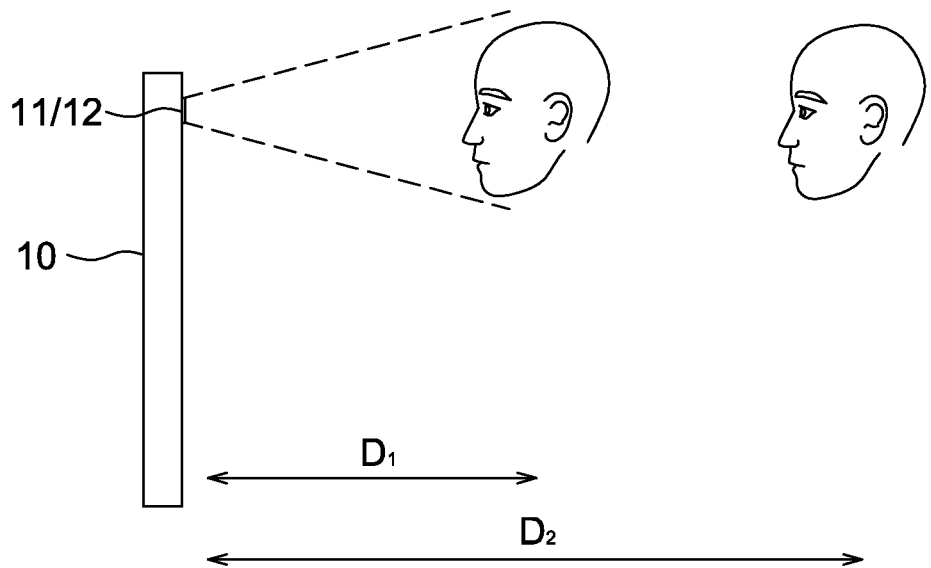
FIGS. 3A-3C are operational schematic diagrams of an auxiliary filtering device for face recognition according to some embodiments of the present disclosure.
Figure 3B:
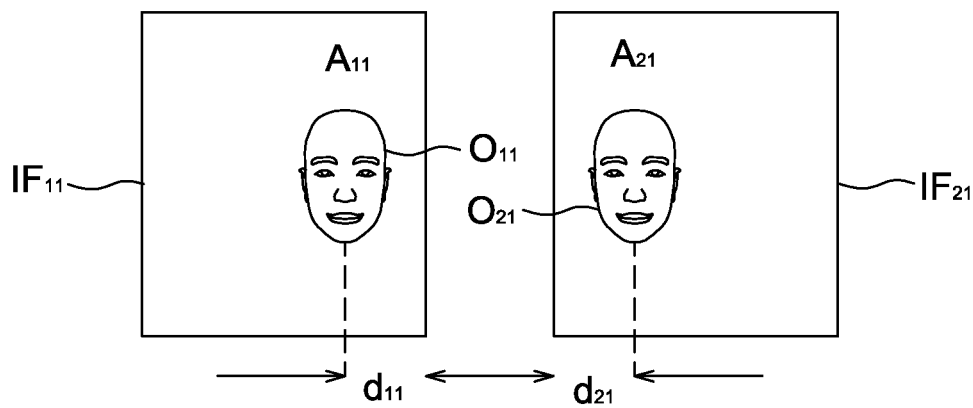
Figure 3C:
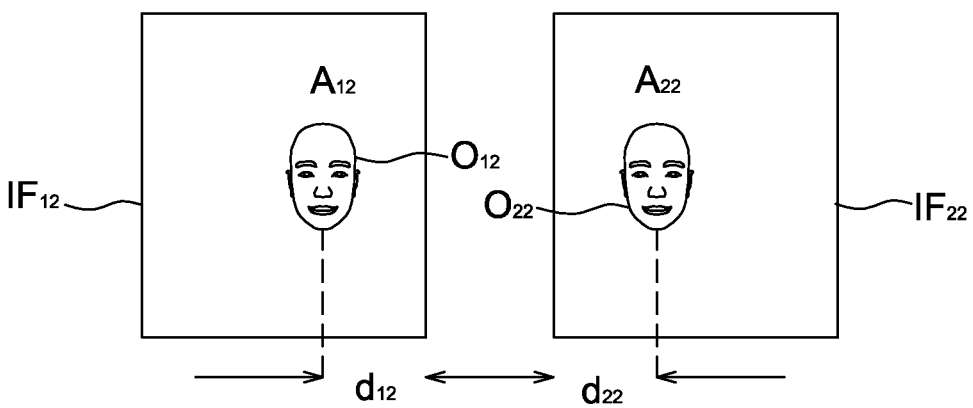

Referring to FIGS. 3A-3C, they are operational schematic diagrams of an auxiliary filtering device for face recognition according to some embodiments of the present disclosure. It is assumed that when a human face is distanced from the electronic device 10 by a first distance $D_1$ (as shown in FIG. 3A), a first image $IF_{11}$ captured by the first camera 11 contains a first face $O_{11}$, and a second image $IF_{12}$ captured by the second camera 12 contains a second face $O_{21}$ (as shown in FIG. 3B). It is assumed that when a human face is distanced from the electronic device 10 by a second distance $D_2$ (as shown in FIG. 3A), a first image $IF_{12}$ captured by the first camera 11 contains a first face $O_{12}$, and a second image $IF_{22}$ captured by the second camera 12 contains a second face $O_{22}$ (as shown in FIG. 3C).

The processor 15 then calculates face positions and face sizes in the first image IF1 (e.g., $IF_{11}$ and $IF_{12}$) and the second image IF2 (e.g., $IF_{21}$ and $IF_{22}$), and compares the calculated result with the relative relationship between positions and sizes stored in the memory 17 to exclude an ineligible object. For example in FIG. 3B, when the processor 15 calculates that a face position in the first image $IF_{11}$ has a distance $d_{11}$ (corresponding to the distance $D_1$) and a face size is $A_{11}$, the processor 15 compares a predetermined face size (e.g., a size range) corresponding to the distance $d_{11}$ stored in the memory 17. When the face size $A_{11}$ is within the predetermined size range, the first face $O_{11}$ (i.e. a current face) is an eligible object. Similarly, when the processor 15 calculates that a face position in the second image $IF_{21}$ has a distance $d_{21}$ (corresponding to the distance $D_2$) and a face size is $A_{21}$, the processor 15 compares whether a face size $A_{21}$ is within a predetermined face range corresponding to the distance $d_{21}$ stored in the memory 17 to identify whether said second face $O_{21}$ (i.e. a current face) is an eligible object. Regarding the operation in FIG. 3C is similar to that in FIG. 3B, and thus details thereof are not repeated herein. Preferably, the processor 15 compares whether the relationship between the face positions and face sizes in both the first image (e.g., $IF_{11}$ and $IF_{12}$) and the second image IF2 (e.g., $IF_{21}$ and $IF_{22}$) matches the predetermined relative relationship or not.

Preferably, the memory 17 previously stores object size ranges corresponding to different object positions to be compared by the processor 15. It should be mentioned that although FIGS. 3B-3C show distances (e.g., $d_{11}$, $d_{12}$, $d_{21}$, $d_{22}$) only along left-right direction in figures as the one-dimensional position of the human face, it is only intended to simplify the illustration. It is possible that the face position of the present disclosure includes two-dimensional positions (e.g., further including distances from an upper edge or lower edge of the image), and each two-dimensional position has a corresponding size or size range being stored in the memory 17. The relative relationship stored in the memory 17 is set by actually measuring a plurality of users before shipment. In this way, when a photo or video is used to perform the unlocking, the electronic security lock cannot be cracked successfully due to not being able to fulfill the relative relationship.

In the present disclosure, after the auxiliary filtering device finishes the recognition of the ineligible object and confirms that a current face is not a photo or a video (i.e. not an ineligible object), the processor 15 further performs the identity recognition through face recognition according to the first image IF1. In some embodiments, the processor 15 performs the identity recognition through face recognition according to the first image IF1 at first, and then uses the auxiliary filtering device to perform the recognition of the ineligible object after a correct identity is recognized. In this case, if the identity is not correct, the auxiliary filtering device does not operate. In other words, the processor 15 has the function of performing the identity recognition according to the first image IF1. In the present disclosure, the processor 15 further performs the filtering of a non-living object according to the first image IF1 and the second image IF2 so as to improve the security.

Figure 4:
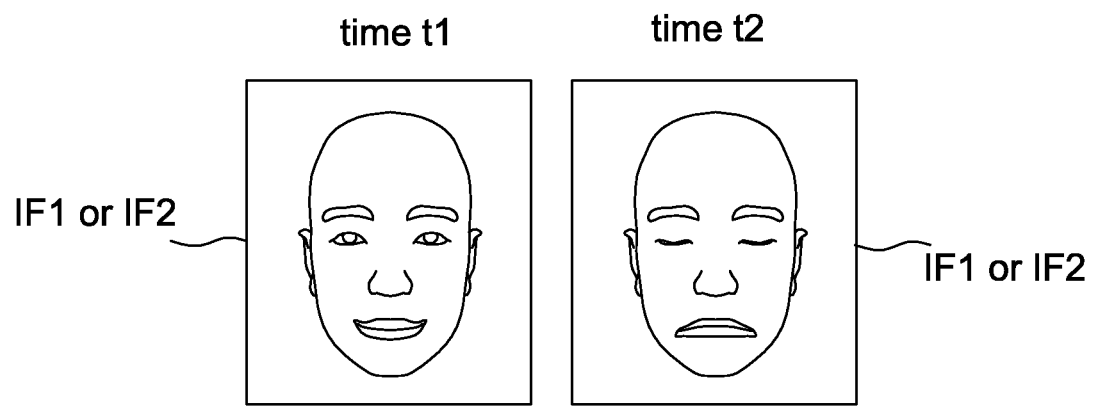
FIG. 4 is an operational schematic diagram of an auxiliary filtering device for face recognition according to another embodiment of the present disclosure.

In addition, to further improve the security, the processor 15 further filters the non-living object according to multiple first images IF1 and/or second images IF2. For example referring to FIG. 4, it is an operational schematic diagram of an auxiliary filtering device for face recognition according to another embodiment of the present disclosure. FIG. 4 shows two images, e.g., shown as first images IF1 and/or second images IF2, captured at two different times t1 and t2 by the first camera 11 and/or the second camera 12. The processor 15 further excludes an ineligible object according to a plurality of first images IF1 captured by the first camera 11 at different times, and identifies a current face in the first images IF1 being the ineligible object when there is no expression difference (as a photo having no expression variation) between the plurality of first images IF1 (e.g., images captured at times t1 and t2); on the contrary, when a face expression exists between the plurality of first images IF1 (e.g., images captured at times t1 and t2), the processor 15 identifies a current face in the first images IF1 is an eligible object. The face expression difference shown in FIG. 4 includes opened/closed eyes and smile/non-smile, but the present disclosure is not limited thereto. The processor 15 herein performs the expression recognition according to the known algorithms. It should be mentioned that the two images shown in FIG. 4 are two images among a plurality of successive images but not necessary two images captured at two adjacent sample times.

Similarly, the processor 15 performs the living object recognition according to a plurality second images IF2 captured at different times by the second camera 12. To prevent the unlocking from using the video, this embodiment preferably operates in conjunction with the relative relationship between positions and sizes illustrated in the previous embodiment.

Figure 5:
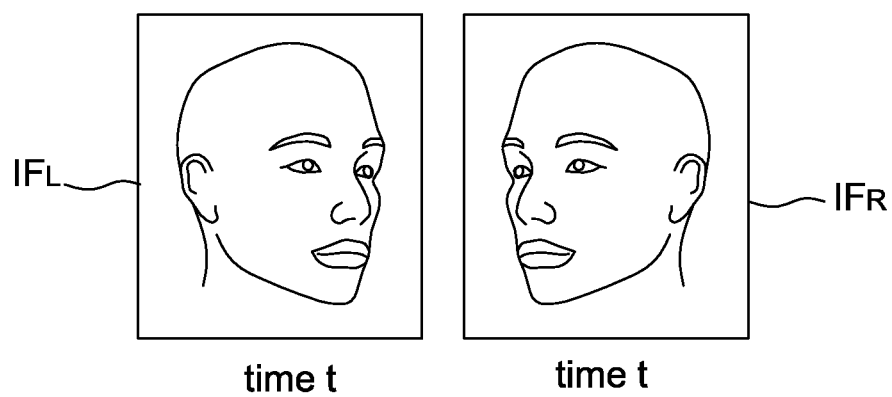
FIG. 5 is an operational schematic diagram of an auxiliary filtering device for face recognition according to an alternative embodiment of the present disclosure.

Referring to FIG. 5, it is an operational schematic diagram of an auxiliary filtering device for face recognition according to an alternative embodiment of the present disclosure. In this embodiment, the processor 15 further excludes an ineligible object according to an image difference between one first image IF1 captured by the first camera 11 and one second image IF2 captured by the second camera 12.

For example, the first camera 11 captures a first image at a first time t and the second image camera 12 captures a second image at the first time t. Based on the arrangement in FIG. 1, the first camera 11 is used to capture a left side image of a human face, and thus the first image in FIG. 5 is shown by $IF_L$; the second camera 12 is used to capture a right side image of the human face, and thus the second image in FIG. 5 is shown by $IF_R$. It is appreciated that the parts of human face captured by the first camera 11 and the second camera 12 are determined according to the arranged locations thereof, and are not limited to that shown herein. In addition, although FIG. 5 shows that the first camera 11 and the second camera 12 captures images substantially at the same time t, the present disclosure is not limited thereto. In other embodiments, the first camera 11 and the second camera 12 respectively capture the images $IF_L$ and $IF_R$ at different times without particular limitations.

The processor 15 calculates a first face feature (e.g., a left ear) in the first image $IF_L$, calculates a second face feature (e.g., a right ear) in the second image $IF_R$, and identifies a face respectively in the first image $IF_L$ and the second image $IF_R$ being an eligible object when the first face feature is not contained in the second image $IF_R$ and the second face feature is not contained in the first image $IF_L$.

In other words, if a photo or video is used to perform the unlocking, the first camera 11 and the second camera 12 will capture the same facial features. Accordingly, a living object is distinguishable when the first image $IF_L$ and the second image $IF_R$ contain different facial features of a same identity. It should be mentioned that said image difference is not limited to the ear shown herein, and is selected from other facial features such as the face angle, birthmark, face profile and so on.

It is possible to perform the above three methods for filtering an ineligible object together to strengthen the security.

Figure 6:
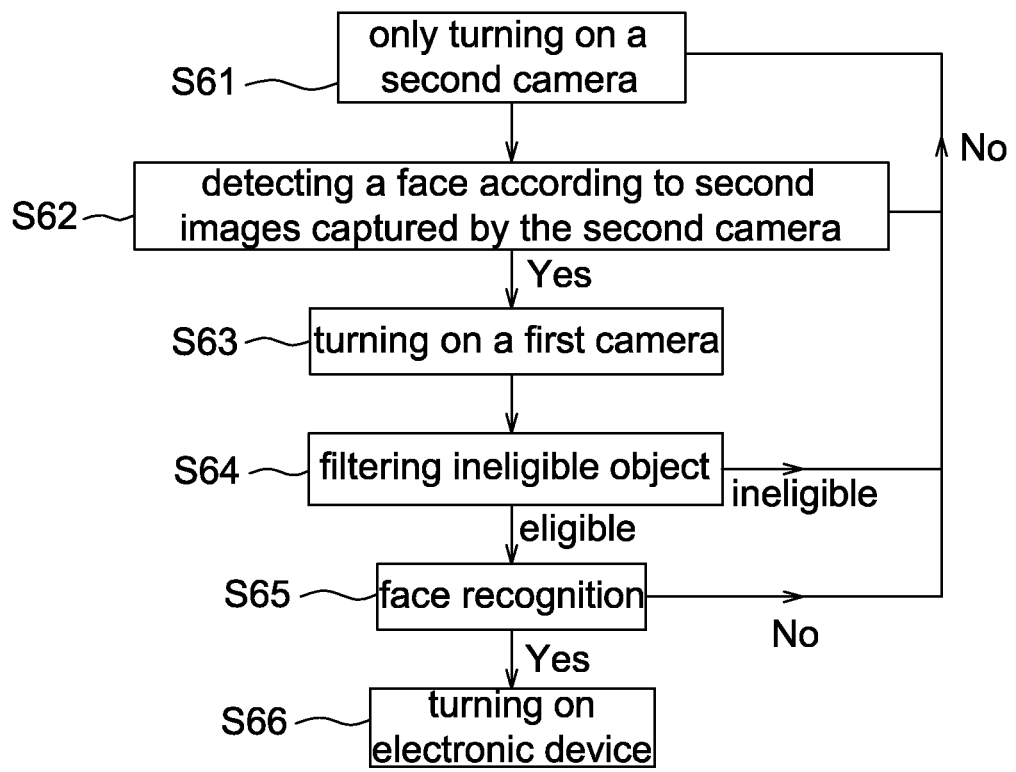
FIGS. 6-7 are flow charts of a starting method for an electronic device according to some embodiments of the present disclosure.

Referring to FIG. 6, it is a flow chart of a starting method for an electronic device according to one embodiment of the present disclosure. The starting method is adaptable to the electronic device 10 in FIGS. 1-2 which include a first camera 11, a second camera 12, a memory 17 and a processor 15. The starting method includes the steps of: always turning on the second camera to capture second images and turning off the first camera (Step S61); performing, by the processor, face detection according to the second images (Step S62); turning on the first camera to capture first images only when a face is detected (Step S63); identifying, by the processor, an ineligible object according to the first images and a second images (Step S64); and confirming whether to turn on the electronic device through face recognition when the face in the second images is not the ineligible object (Steps S65-S66).

Step S61:

In the present disclosure, preferably the second camera 12 is always turned on to capture second images IF2 at a sample rate. Meanwhile, except the second camera 12 and the processor 15 which performs the face detection algorithm are turned on to operate continuously, other components of the electronic device 10 are under sleep mode in this step to reduce the power consumption. That is, before a human face is detected by the second camera 12, the first camera 11 is turned off. Said turned on in this step is referred to that as long as the operation power is obtainable, the second camera 12 and the processor 15 operates continuously.

Step S62:

The processor 15 then identifies whether the captured second image IF2 contains a human face according to the built-in face detection algorithm. It should be mentioned that in this step the processor 15 does not recognize the identity of the human face, but only identifies whether an object contained in the second image IF2 is a human face or not. The face detection algorithm herein uses the known algorithms as long as a human face is detectable.

Step S63:

When the processor 15 identifies the second image IF2 containing a human face, the first camera 11 is then turned on to capture first images IF1. As mentioned above, the face detection in this step does not perform the identity recognition. Preferably, the first camera 11 captures images synchronizing with the second camera 12, but not limited thereto. In other embodiments, the first camera 11 and the second camera 12 capture images in a time division manner.

Step S64:

Next, the processor 15 identifies whether a current face is an eligible object or not according to the above methods in FIGS. 3A-3C, 4 and 5.

For example in FIGS. 3A-3C, the processor 15 calculates face positions (e.g., $d_{11}$, $d_{12}$, $d_{21}$, $d_{22}$) and face sizes (e.g., $A_{11}$, $A_{12}$, $A_{21}$, $A_{22}$) respectively in the first image IF1 and the second image IF2; and compares a calculated result with the relative relationship stored in the memory 17 to identify whether the current face is an ineligible object, wherein the memory 17 previously stores the relative relationship between object positions and object sizes in an image.

As mentioned above, to improve the filtering ability, the filtering method in FIGS. 3A-3C operates in conjunction with that in FIG. 4. That is, the processor 15 identifies the ineligible object according to an expression difference between a plurality of first images IF1 captured by the first camera 11 at different times (e.g., times t1 and t2) or between a plurality of second images IF2 captured by the second camera 12 at different times (e.g., times t1 and t2). As mentioned above, the processor 15 uses the known expression recognition algorithms to perform the expression recognition.

In another embodiment, the processor 15 calculates a first face feature in the first images IF1 and a second face feature in the second images IF2; and identifies a face in the second image IF2 is not the eligible object when the first face feature is not contained in the second images IF2 and the second face feature is not contained in the first images IF1 as shown in FIG. 5.

In other embodiments, the filtering method in FIG. 5 further operates in conjunction with that in FIG. 4. The method has been illustrated above, and thus details thereof are not repeated herein.

Step S65:

When the processor 15 identifies that a current face in the first image IF1 and/or the second image IF2 is a living object (i.e. not ineligible object), the processor 15 then performs the identity recognition through the face recognition. When a number of pixels of the first image IF1 is much higher than that of the second image IF2, the processor 15 preferably uses the first image IF1 to perform the face recognition. However, if a number of pixels of the second image IF2 is high enough for the face recognition, the processor 15 uses the second image IF2 to perform the face recognition.

Step S66:

Finally, when the processor 15 recognizes that the current face is a registered face (i.e. a correct identity), the electronic device 10 is turned on, e.g., turning on the screen 13 and other components to allow a user to operate the electronic device 10. In the present disclosure, as an additional step of filtering ineligible object is added (e.g., the Step S64), it is effectively to prevent the electronic security lock from being cracked by a picture or video. As long as an ineligible object is confirmed, the electronic device 10 is not turned on.

Figure 7:
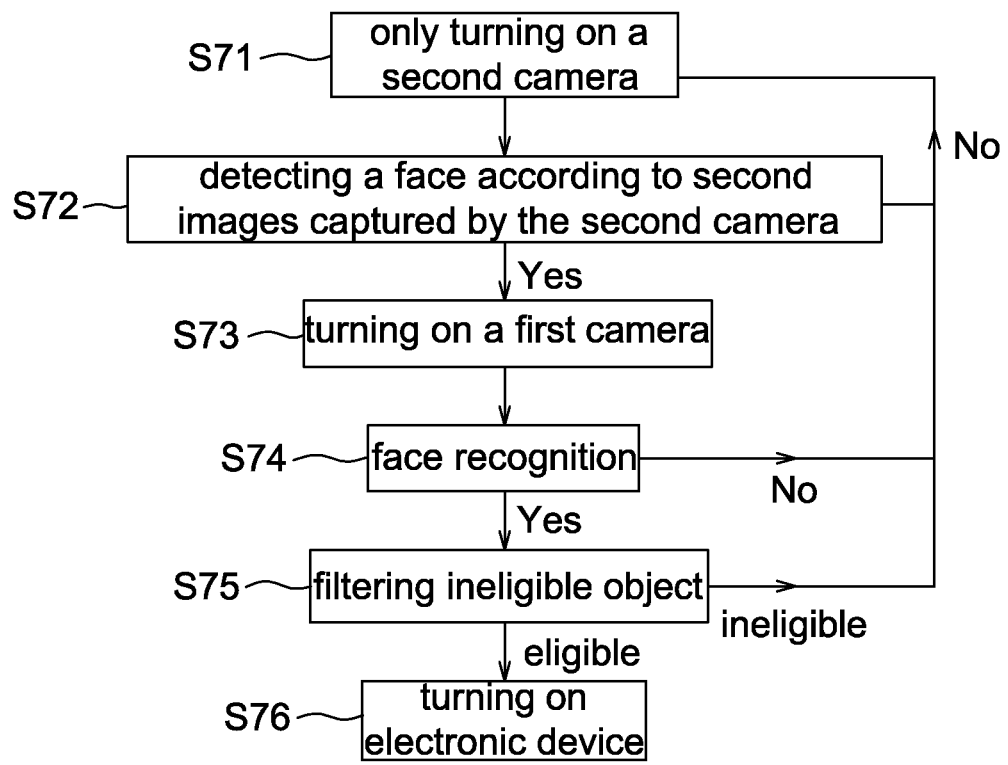

Referring to FIG. 7, it is a flow chart of a starting method for an electronic device according to another embodiment of the present disclosure. The difference between FIGS. 7 and 6 is that a sequence of the filtering an ineligible object and performing face recognition is exchanged. That is, in the present disclosure it is possible to perform the face recognition before or after identifying the ineligible object. Details of every step in FIG. 7 are identical to FIG. 6, and thus details thereof are not repeated herein.

In some embodiments, the auxiliary filtering device further includes a light source to provide light for the image capturing of the first camera 11 and the second camera 12.

As mentioned above, the conventional face recognition is not able to distinguish the difference of a face image in a picture or video from a real face such that has the problem of lower data security. Therefore, the present disclosure further provides an auxiliary filtering device for face recognition (as shown in FIGS. 1-2) and a starting method for an electronic device (as shown in FIGS. 6-7) that perform a living body recognition in addition to the identity recognition so as to confirm a current face not belong to a face contained in a photo or video to improve the data security.

Although the disclosure has been explained in relation to its preferred embodiment, it is not used to limit the disclosure. It is to be understood that many other possible modifications and variations can be made by those skilled in the art without departing from the spirit and scope of the disclosure as hereinafter claimed.

What is claimed is:

1. An electronic device, comprising:
   a first camera configured to capture a first image;
   a second camera configured to capture a second image;
   a memory configured to previously store a relative relationship between face positions and face sizes in an image; and
   a processor configured to
      calculate a first distance of a first face position from a first edge of the first image and a first face size of a first face in the first image, and
      compare the first face size with a first predetermined size range corresponding to the first distance to identify whether the first face is an ineligible object,
   wherein a number of pixels of the second camera is smaller than that of the first camera.

2. The electronic device as claimed in claim 1, wherein the electronic device is a cellphone, and the first camera is a front camera of the cellphone.

3. The electronic device as claimed in claim 1, wherein the processor is further configured to perform identity recognition through face recognition according to the first image.

4. The electronic device as claimed in claim 1, wherein the processor is further configured to
 exclude the ineligible object according to a plurality of first images captured by the first camera at different times, and
 identify a current face in the first images being the ineligible object when there is no expression difference between the plurality of first images.

5. The electronic device as claimed in claim 1, wherein the processor is further configured to
 exclude the ineligible object according to a plurality of second images captured by the second camera at different times, and
 identify a current face in the second images being the ineligible object when there is no expression difference between the plurality of second images.

6. The electronic device as claimed in claim 1, wherein the processor is further configured to exclude the ineligible object according to an image difference between one first image captured by the first camera and one second image captured by the second camera.

7. The electronic device as claimed in claim 1, wherein when the first face size is within the first predetermined size range, the first face is an eligible object.

8. The electronic device as claimed in claim 1, wherein the processor is further configured to
 calculate a second distance of a second face position from a second edge of the second image and a second face size of a second face in the second image, and
 compare the second face size with a second predetermined size range corresponding to the second distance to identify whether the second face is an ineligible object.

9. The electronic device as claimed in claim 1, wherein the first edge is a left edge or a right edge of the first image.

10. An electronic device, comprising:
 a first camera configured to capture a first image;
 a second camera configured to capture a second image;
 a memory configured to previously store a relative relationship between face positions and face sizes in an image; and
 a processor configured to
  calculate a first two-dimensional position and a first face size of a first face in the first image, and
  compare the first face size with a first predetermined size range corresponding to the first two-dimensional position to identify whether the first face is an ineligible object,
 wherein when the first face size is within the first predetermined size range, the first face is an eligible object.

11. The electronic device as claimed in claim 10, wherein the electronic device is a cellphone, and the first camera is a front camera of the cellphone.

12. The electronic device as claimed in claim 10, wherein a number of pixels of the second camera is smaller than that of the first camera.

13. The electronic device as claimed in claim 12, wherein the processor is further configured to perform identity recognition through face recognition according to the first image.

14. The electronic device as claimed in claim 12, wherein the processor is further configured to
 exclude the ineligible object according to a plurality of first images captured by the first camera at different times, and
 identify a current face in the first images being the ineligible object when there is no expression difference between the plurality of first images.

15. The electronic device as claimed in claim 12, wherein the processor is further configured to
 exclude the ineligible object according to a plurality of second images captured by the second camera at different times, and
 identify a current face in the second images being the ineligible object when there is no expression difference between the plurality of second images.

16. The electronic device as claimed in claim 10, wherein the processor is further configured to exclude the ineligible object according to an image difference between one first image captured by the first camera and one second image captured by the second camera.

17. The electronic device as claimed in claim 10, wherein the processor is further configured to
 calculate a second two-dimensional position and a second face size of a second face in the second image, and
 compare the second face size with a second predetermined size range corresponding to the second two-dimensional position to identify whether the second face is an ineligible object.

18. An electronic device, comprising:
 a first camera configured to capture a first image;
 a second camera configured to capture a second image;
 a memory configured to previously store a relative relationship between face positions and face sizes in an image; and
 a processor configured to
  calculate a first distance of a first face position from a first edge of the first image and a first face size of a first face in the first image, and
  compare the first face size with a first predetermined size range corresponding to the first distance to identify whether the first face is an ineligible object,
 wherein the first edge is a left edge or a right edge of the first image.

* * * * *